US012055167B2

(12) United States Patent
Gerngross et al.

(10) Patent No.: US 12,055,167 B2
(45) Date of Patent: Aug. 6, 2024

(54) HYDRAULIC CIRCUIT INCLUDING HYDRAULIC DECOMPRESSION ENERGY RECLAMATION

(71) Applicant: Robert Bosch GmbH, Stuttgart (DE)

(72) Inventors: Royce Gerngross, Houston, TX (US); Jim E. Diehl, Lehighton, PA (US); Oliver Gerhard, Zellingen (DE); Reiner Knoell, Burgsinn (DE)

(73) Assignees: Bosch Rexroth Corporation, Broadview, IL (US); Robert Bosch GmbH, Stuttgart (DE)

( * ) Notice: Subject to any disclaimer, the term of this patent is extended or adjusted under 35 U.S.C. 154(b) by 34 days.

(21) Appl. No.: 17/506,112

(22) Filed: Oct. 20, 2021

(65) Prior Publication Data

US 2022/0136535 A1 May 5, 2022

Related U.S. Application Data

(60) Provisional application No. 63/107,542, filed on Oct. 30, 2020.

(51) Int. Cl.
*F15B 21/14* (2006.01)
*F15B 1/02* (2006.01)
(Continued)

(52) U.S. Cl.
CPC .............. *F15B 21/14* (2013.01); *F15B 1/024* (2013.01); *F15B 7/006* (2013.01); *F15B 21/006* (2013.01); *F15B 1/033* (2013.01); *F15B 7/008* (2013.01); *F15B 7/10* (2013.01); *F15B 11/08* (2013.01); *F15B 15/12* (2013.01); *F15B 2201/411* (2013.01); *F15B 2201/413* (2013.01); *F15B 2211/20515* (2013.01);
(Continued)

(58) Field of Classification Search
CPC ............ F15B 21/14; F15B 2211/20515; F15B 2211/20561; F15B 2211/212; F15B 2211/27; F15B 2211/613; F15B 2211/625; F15B 2211/7054; F15B 11/08
See application file for complete search history.

(56) References Cited

U.S. PATENT DOCUMENTS 4,046,270 A * 9/1977 Baron ...................... E02F 3/30 60/413
6,971,463 B2 12/2005 Shore
(Continued)

*Primary Examiner* — Dustin T Nguyen
(74) *Attorney, Agent, or Firm* — Kelly McGlashen; Maginot, Moore & Beck LLP

(57) ABSTRACT

A hydraulic circuit includes a prime mover that is configured to generate an oscillating flow of hydraulic fluid, and an actuator that is driven by the prime mover and configured to provide oscillating motion and to be connected to a load in each direction of the motion. The hydraulic circuit also includes a reclamation device that is disposed in the hydraulic circuit between the prime mover and the actuator. The reclamation device captures and stores a portion of hydraulic fluid displaced from the actuator during a transition between opposed motions, where the portion of hydraulic fluid corresponds to an amount of hydraulic fluid equal to a volume of fluid required to compensate for compression of fluid within the hydraulic circuit due to system pressure and load pressure. The stored fluid is used by the circuit in a subsequent motion.

10 Claims, 6 Drawing Sheets

(51) Int. Cl.

| | |
|---|---|
| ***F15B 7/00*** | (2006.01) |
| ***F15B 21/00*** | (2006.01) |
| *F15B 1/033* | (2006.01) |
| *F15B 7/10* | (2006.01) |
| *F15B 11/08* | (2006.01) |
| *F15B 15/12* | (2006.01) |

(52) U.S. Cl.

CPC ............... *F15B 2211/20546* (2013.01); *F15B 2211/20561* (2013.01); *F15B 2211/20576* (2013.01); *F15B 2211/20584* (2013.01); *F15B 2211/212* (2013.01); *F15B 2211/27* (2013.01); *F15B 2211/41572* (2013.01); *F15B 2211/50518* (2013.01); *F15B 2211/50527* (2013.01); *F15B 2211/5157* (2013.01); *F15B 2211/611* (2013.01); *F15B 2211/613* (2013.01); *F15B 2211/615* (2013.01); *F15B 2211/625* (2013.01); *F15B 2211/6651* (2013.01); *F15B 2211/7054* (2013.01); *F15B 2211/7058* (2013.01); *F15B 2211/7128* (2013.01); *F15B 2211/88* (2013.01)

(56) References Cited

U.S. PATENT DOCUMENTS

| | | | | |
|---|---|---|---|---|
| 7,269,944 | B2 | 9/2007 | Zhang | |
| 7,325,398 | B2 * | 2/2008 | Cherney | E02F 9/2217 60/476 |
| 7,793,740 | B2 | 9/2010 | Thomson | |
| 8,826,654 | B2 * | 9/2014 | Nelson | F01P 7/044 60/416 |
| 8,857,168 | B2 * | 10/2014 | Opdenbosch | E02F 9/2296 91/437 |
| 8,959,905 | B2 * | 2/2015 | Baltes | F16H 61/4096 60/416 |
| 9,802,469 | B2 | 10/2017 | Ornella | |
| 9,809,957 | B2 | 11/2017 | Rosth | |
| 9,914,127 | B2 * | 3/2018 | Burhoff | F15B 1/021 |
| 10,344,784 | B2 * | 7/2019 | Peterson | F15B 1/033 |
| 10,363,934 | B2 * | 7/2019 | Ornella | F16H 61/438 |
| 10,378,559 | B2 | 8/2019 | Bissbort | |
| 10,562,365 | B2 * | 2/2020 | Schmidt | B60G 15/068 |
| 10,982,761 | B2 * | 4/2021 | Mitsui | F15B 7/006 |
| 11,255,429 | B2 * | 2/2022 | Giorgio Bort | B60K 6/12 |
| 2013/0133318 | A1 * | 5/2013 | Vogl | B60K 6/12 60/459 |
| 2014/0033698 | A1 * | 2/2014 | Opdenbosch | F15B 7/006 60/494 |
| 2015/0204356 | A1 * | 7/2015 | Krittian | F15B 1/024 60/413 |
| 2016/0265559 | A1 * | 9/2016 | Peterson | F15B 7/006 |
| 2017/0356476 | A1 * | 12/2017 | Lesage | B64C 13/50 |
| 2022/0145770 | A1 * | 5/2022 | Yang | F01D 17/10 |

* cited by examiner

HYDRAULIC CIRCUIT INCLUDING HYDRAULIC DECOMPRESSION ENERGY RECLAMATION

BACKGROUND

Hydraulic circuits enable transmission and control of power or signals through fluids, particularly liquids, and may be used in industrial and mobile applications to transmit power from a prime mover to operate machine parts or vehicles. Hydraulic circuits are composed of a number of components such as a prime mover that is configured to supply pressurized hydraulic fluid to an actuator that converts the fluid pressure into mechanical force, as well as ancillary components such as valves, filters, etcetera, which are connected to each other directly or by means of piping or manifolds.

Because fluids are compressible, the volume $V_{min}$ of fluid at a minimum pressure $P_{min}$ must be increased in order to fill a system volume $V_{system}$ at a higher pressure $P_s$. The extra volume is referred to herein as the "additional compressed volume" $V_c$, whereby the volume $V_{min}$ of fluid drawn from a reservoir at pressure $P_{min}$ compressed to a higher pressure $P_s$ $$V_{min}=V_{system}+V_c$$

The fluid contained in one side of an actuator, along with the fluid contained in the hydraulic lines leading to that actuator (corresponding to the system volume $V_{system}$) must be raised to a higher pressure $P_s$ in order to move a load and do meaningful work. The fluid in the rest of the system rests at the minimum pressure $P_{min}$. The load pressure $P_{load}$ is the pressure differential required to move the load and therefore the higher pressure $P_s$ is defined as follows:

$$P_s=P_{load}+P_{min}$$

This pressure rise is accomplished by a prime mover doing work by adding the additional compressed volume $V_c$ at the minimum pressure $P_{min}$ to the system volume $V_{system}$ at the higher pressure $P_s$. This requires energy, which is calculated by the change in volume multiplied by the change in pressure (Work=$V_c$*$P_{load}$).

The additional compressed volume $V_c$ is a function of change in pressure multiplied by the system volume $V_{system}$ multiplied by a constant of the particular fluid being compressed (κ).

$$V_c=P_{load}*V_{system}*\kappa$$

In the case of linear actuators, the system volume $V_{system}$ is increased as a function of actuator position and therefore the additional compressed volume $V_c$ changes with actuator position. The term "additional compressed volume" $V_c$, as used herein, refers to the volume of fluid in excess of the physical volume $V_{system}$ that is raised from the minimum pressure $P_{min}$ to the higher pressure $P_s$ in chamber $V_{system}$ at any given state of an actuator.

Because the process of raising the pressure of a volume of fluid, e.g., the additional compressed volume $V_c$, is work but provides no useful work, it is wasted power.

In an oscillating hydraulic circuit having a linear actuator, the actuator alternately moves forward and backward. In an oscillating hydraulic circuit having a rotary actuator, the actuator alternates between a forward rotation and a reverse rotation. Regardless of whether it has a linear or rotary configuration, when the actuator reaches its end or "reversing" position, the entire additional compressed volume $V_c$ of hydraulic fluid must be displaced or moved to the opposite side of the actuator in order to reverse the movement. When the volume on the high pressure side of the system is greater than the volume on the low pressure side, and the additional compressed volume $V_c$ is not displaced it is impossible to reverse the system without hydraulically locking the circuit.

To avoid hydraulic lock, the fluid needs to be decompressed by purposely removing an amount of fluid approximately equal to the additional compressed volume $V_c$, or increasing the system volume $V_{system}$ without adding any additional fluid. In some conventional hydraulic circuits, the excess fluid is bled off to a reservoir to lower the pressure, essentially wasting the energy and creating heat. The same may be true when it becomes necessary to unload an actuator from a static load.

SUMMARY

In some aspects, a hydraulic circuit includes a prime mover that is configured to generate flow of hydraulic fluid within the hydraulic circuit. The prime mover includes a prime mover A port and a prime mover B port. The hydraulic circuit includes an actuator that includes an actuator A port that is connected to the prime mover A port via a first fluid line, and an actuator B port that is connected to the prime mover B port via a second fluid line. The actuator is configured to a) provide a motion that oscillates between an advancing stroke in a first direction and a retracting stroke in second direction that is opposed to the first direction, the motion achieved via hydraulic fluid provided by the prime mover via the first and second fluid lines, and b) be connected to a load in each of the advancing stroke and the retracting stroke. In addition, the hydraulic circuit includes a reclamation device that is disposed in the hydraulic circuit between the prime mover and the actuator. The reclamation device is configured to capture and store a portion of hydraulic fluid displaced from the actuator during a transition between the advancing stroke and the retracting stroke, where the portion of hydraulic fluid corresponds to an amount of hydraulic fluid equal to a volume of fluid required to compensate for compression of fluid within the hydraulic circuit due to system pressure and load pressure.

In some embodiments, the reclamation device includes a reclamation accumulator that is connected to the first fluid line via a first branch line and is connected to the second fluid line via a second branch line; a first control valve disposed in the first branch line between the reclamation accumulator and the first fluid line; and a second control valve disposed in the second branch line between the reclamation accumulator ant the second fluid line. The first branch line is connected to the first fluid line at a location between the prime mover A port and the actuator A port, and the second branch line is connected to the second fluid line at a location between the prime mover B port and the actuator B port.

In some embodiments, the reclamation device includes a first reclamation module connected to the first fluid line between the prime mover A port and the actuator A port. The first reclamation module is configured to receive and store hydraulic fluid displaced from the actuator during a transition from the advancing stroke to the retracting stroke. The reclamation device includes a second reclamation module connected to the second fluid line between the prime mover B port and the actuator B port. The second reclamation module is configured to receive and store hydraulic fluid displaced from the actuator during a transition from the retracting stroke to the advancing stroke.

In some embodiments, the first reclamation module returns the captured and stored hydraulic fluid to the hydraulic circuit during a transition from the retracting stroke to the advancing stroke, and the second reclamation module returns the captured and stored hydraulic fluid to the circuit during a transition from the advancing stroke to the retracting stroke.

In some embodiments, the first reclamation module is connected to the first fluid line via a first branch line, and the first branch line is connected to the first fluid line at a location between the prime mover A port and the actuator A port. The first reclamation module includes a first reclamation accumulator that is connected to a terminus of the first branch line, and a first control valve that is disposed in the first branch line between the first reclamation accumulator and the first fluid line. The second reclamation module is connected to the second fluid line via a second branch line. The second branch line is connected to the second fluid line at a location between the prime mover B port and the actuator B port. In addition, the second reclamation module includes a second reclamation accumulator that is connected to a terminus of the second branch line, and a second control valve disposed in the second branch line between the second reclamation accumulator and the second fluid line.

In some embodiments, the hydraulic circuit is a closed circuit, and the prime mover includes a bi-direction fluid pump that is driven by a variable speed electric motor.

In some embodiments, the prime mover includes single-direction fluid pump that is driven by a constant speed electric motor and is configured to draw hydraulic fluid from a reservoir.

In some embodiments, the prime mover includes a pair of bi-direction fluid pumps that are driven by an electric motor, and a charge pump configured to provide a charge pressure to each of the pair of bi-direction fluid pumps, and the pair of bi-direction fluid pumps and the charge pump are each configured to draw hydraulic fluid from a reservoir.

In some embodiments, the actuator is a linear actuator.

In some embodiments, the actuator is a rotary actuator.

In some embodiments, the actuator includes a cylinder, a piston disposed in the cylinder that segregates an interior space of the cylinder into a first chamber that includes the actuator A port and a second chamber that includes the actuator B port, a first rod disposed in the first chamber and having a first end that is connected to one side of the piston, and a second end that is configured to be connected to a load, and a second rod disposed in the second chamber and having a first end that is connected to another side of the piston, and a second end that is configured to be connected to a load.

In some embodiments, the actuator includes a hydraulic motor.

In some embodiments, the actuator includes a cylinder, a piston disposed in the cylinder that segregates an interior space of the cylinder into a first chamber that includes the actuator A port and a second chamber that includes the actuator B port, and a rod disposed in the second chamber and having a first end that is connected to one side of the piston, and a second end that is configured to be connected to a load.

In some embodiments, the actuator includes a first cylinder and a second cylinder. The actuator includes a first piston disposed in the first cylinder, and the first piston segregates an interior space of the first cylinder into a first chamber that is connected to the actuator A port and a second chamber that is connected to the actuator B port. A first rod is disposed in the second chamber and has a first rod first end that is connected to one side of the first piston, and a first rod second end that is configured to be connected to a load. The actuator includes a second piston disposed in the second cylinder. The second piston segregates an interior space of the second cylinder into a third chamber that is connected to the actuator A port and a fourth chamber that is connected to the actuator B port. A second rod is disposed in the third chamber and has a second rod first end that is connected to one side of the second piston, and a second rod second end that is configured to be connected to a load.

In some embodiments, the hydraulic circuit is a closed circuit, and the prime mover includes a bi-direction fluid pump that is driven by a variable speed electric motor. In addition, the actuator includes a cylinder, a piston disposed in the cylinder that segregates an interior space of the cylinder into a first chamber that includes the actuator A port and a second chamber that includes the actuator B port, a first rod disposed in the first chamber and having a first rod first end that is connected to one side of the piston, and a first rod second end that is configured to be connected to a load, and a second rod disposed in the second chamber and having a second rod first end that is connected to another side of the piston, and a second rod second end that is configured to be connected to a load.

In some embodiments, the prime mover includes a variable speed, single-direction fluid pump that is driven by a constant speed electric motor and is configured to draw hydraulic fluid from a reservoir, and the actuator comprises a hydraulic motor.

In some embodiments, the prime mover includes single-direction fluid pump that is driven by a constant speed electric motor and is configured to draw hydraulic fluid from a reservoir. In addition, the actuator includes a cylinder, a piston disposed in the cylinder that segregates an interior space of the cylinder into a first chamber that includes the actuator A port and a second chamber that includes the actuator B port, and a rod disposed in the second chamber and having a first end that is connected to one side of the piston, and a second end that is configured to be connected to a load.

In some embodiments, the prime mover includes a pair of bi-direction fluid pumps that are driven by an electric motor, and a charge pump configured to provide a charge pressure to each of the pair of bi-direction fluid pumps. The pair of bi-direction fluid pumps and the charge pump are each configured to draw hydraulic fluid from a reservoir. In addition, the actuator includes a first cylinder, and a first piston disposed in the first cylinder. The first piston segregates an interior space of the first cylinder into a first chamber that is connected to the actuator A port and a second chamber that is connected to the actuator B port. The actuator includes a first rod disposed in the second chamber and having a first rod first end that is connected to one side of the first piston, and a first rod second end that is configured to be connected to a load. The actuator includes a second cylinder, and a second piston disposed in the second cylinder. The second piston segregates an interior space of the second cylinder into a third chamber that is connected to the actuator A port and a fourth chamber that is connected to the actuator B port. The actuator includes a second rod disposed in the third chamber and having a second rod first end that is connected to one side of the second piston, and a second rod second end that is configured to be connected to a load.

A hydraulic circuit of an oscillating hydraulic system employs a decompression reclamation device that includes accumulators and isolation valves to avoid hydraulic lock, and to capture decompression energy for subsequent use.

The decompression reclamation device disclosed herein enables the hydraulic circuit to capture and store energy used for compressing the fluid for later use. This concept is applicable to any hydraulic system utilizing an oscillating motion with a load.

The addition of the decompression reclamation device to the oscillating hydraulic circuit allows a volume increase approximately equal to the additional compressed volume $V_c$ on the side at higher pressure $P_s$, reducing its pressure to a nominal value near the minimum pressure $P_{min}$ and simultaneously capturing a portion of the potential energy stored within the compressed fluid, prior to reversal.

In addition to energy storage, the decompression reclamation device also reduces hydraulic shock associated with rapid decompression. At the time of each reversal, system pressures are first reduced through the decay of pressure induced by the additional compressed volume $V_c$ into the decompression reclamation device.

In addition to energy storage, the decompression reclamation device also eliminates the need for a rapid removal of fluid from the main circuit, which increases stability in any auxiliary circuit devised to maintain the minimum pressure $P_{min}$. At the time of each reversal, the higher pressure $P_s$ is reduced through increasing the system volume $V_{system}$ without the addition of more fluid. The additional volume is provided by the decompression reclamation device.

In the oscillating hydraulic circuit, the type of actuator and components controlling the direction of flow to the actuator can vary depending on system requirements.

DETAILED DESCRIPTION

Figure 1:
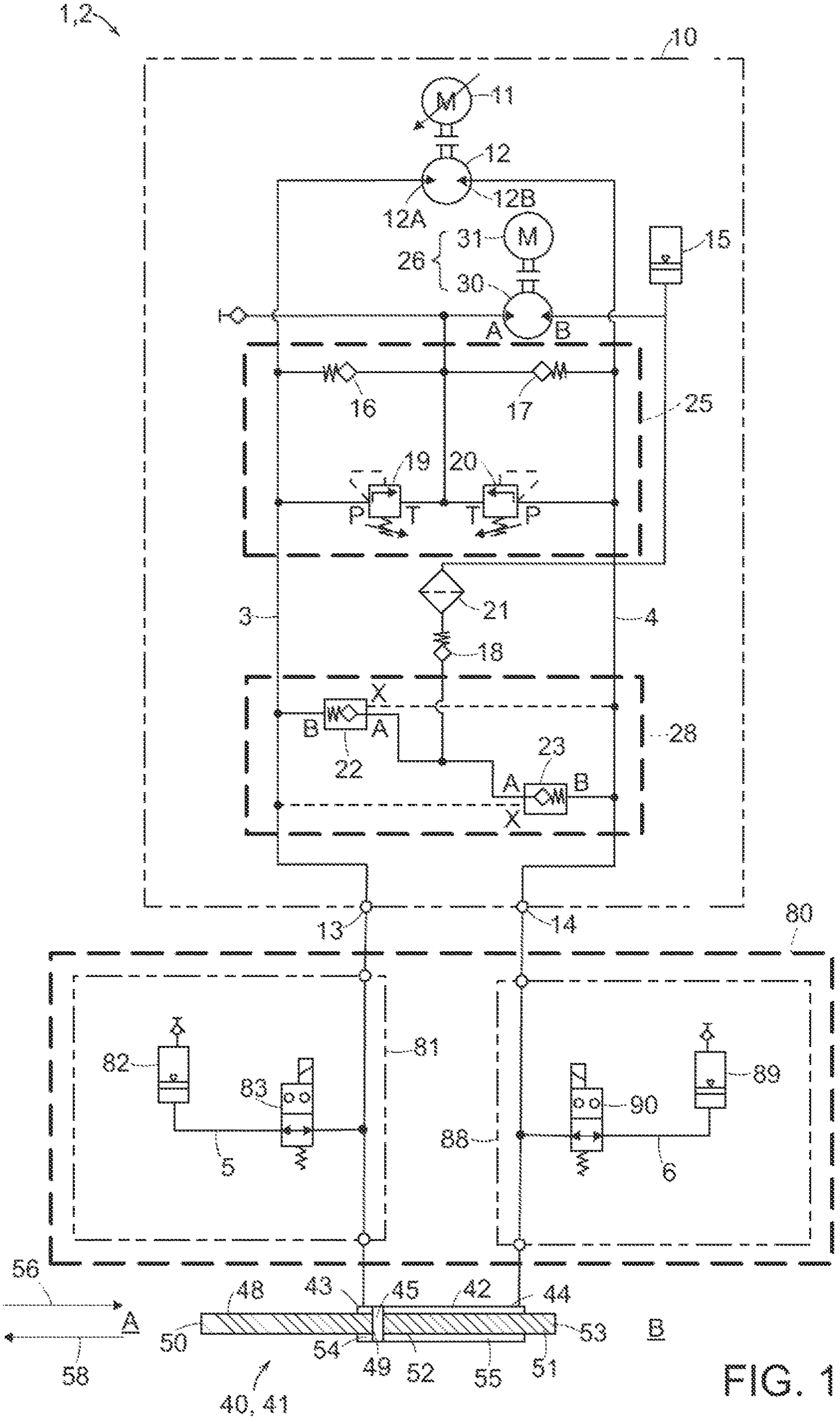
FIG. 1 is a schematic diagram of a hydraulic circuit employed in an oscillating hydraulic system.

Referring to FIG. 1, an oscillating hydraulic system 1 includes a hydraulic circuit 2. The hydraulic circuit 2 includes an actuator 40 that performs work, and a prime mover 10 that controls the flow of hydraulic fluid to the actuator 40. As used herein, the term "hydraulic fluid" refers to the fluid within the hydraulic circuit 2. In the illustrated embodiment, the hydraulic fluid is oil, but is not limited thereto. The hydraulic circuit 2 also includes a reclamation device 80 disposed in the hydraulic circuit 2 between the prime mover 10 and the actuator 40. The reclamation device 80 permits the oscillating hydraulic system 1 to avoid hydraulic lock by allowing a high pressure side of the actuator to decompress immediately preceding a reversal of actuation direction. In addition, the reclamation device 80 permits the hydraulic system to capture (reclaim) the decompression energy for subsequent use by the hydraulic system, as discussed in detail below.

The prime mover 10 may be any hydraulic source that is configured to create an oscillating flow of hydraulic fluid between the two fluid ports of the prime mover 10, e.g., the prime mover A port 13 and the prime mover B port 14. In the illustrated embodiment, the prime mover 10 includes a fixed displacement bi-directional pump 12 that is driven by a variable speed electric motor 11. The electric motor 11 controls the speed and direction of the pump 12. The pump 12 includes a pump A port 12A that is connected to the prime mover A port 13 and an A port 43 of the actuator 40 via a first fluid line 3 of the hydraulic circuit 2. In addition, the pump 12 includes a pump B port 12B that is connected to the prime mover B port 14 and a B port 44 of the actuator 40 via a second fluid line 4.

The prime mover 10 includes a pressure relief device 25 connected to the first and second fluid lines 3, 4, and thus to the pump 12, via first and second check valves 16, 17. The pressure relief device 25 includes a pair of adjustable pressure relief valves 19, 20 that are configured to prevent damage to circuit components due to over-pressurization of the hydraulic circuit 2.

The prime mover 10 includes a constant pressure source such as a charge pump 30 that is driven by an electric motor 31 and is connected to the first and second fluid lines 3, 4 via check valves 16, 17. The charge pump 30 maintains lines 3 and 4 at a minimum pressure of $P_{min}$. The charge pump 30 draws its fluid from a main accumulator 15. The main accumulator 15 is a low pressure, gas charged, expansion tank that is sized to store excess hydraulic fluid volume from the actuator 40, prime mover 10, and reclamation device 80 during operation and in a de-energized state. The charge pump 30 provides a charge pressure corresponding to the minimum pressure $P_{min}$ for the hydraulic circuit 2, accommodating leakages within the hydraulic circuit 2 and maintaining the hydraulic circuit pressure at a desired nominal value.

The prime mover 10 includes a flushing device 28 that is connected to the first and second fluid lines 3, 4 in parallel to the pressure relief device 25, and is configured to remove heat from the hydraulic circuit 2. The flushing device 28 includes a pair of pilot operated check valves 22, 23 and is connected to the reservoir, for example main accumulator 15, via a check valve 18 and a filter 21.

The actuator 40 may be any actuator that can receive an oscillating flow of hydraulic fluid from the prime mover 10, and create an oscillating motion from the oscillating flow, thereby performing work. In the illustrated embodiment, the actuator 40 is double-rod hydraulic cylinder 41 that includes a cylinder housing 42, a piston 45 that is disposed in the cylinder housing 42. The piston 45 forms a seal with the cylinder housing 42 and segregates an interior space of the cylinder housing 42 into a first chamber 54 that includes the actuator A port 43 and a second chamber 55 that includes the actuator B port 44. The cylinder 41 includes a first rod 48 disposed in the first chamber 54. A first end 49 of the first rod 48 is connected to one side of the piston 45, and a second end 50 of the first rod 48 protrudes out of the cylinder housing 42 is configured to be connected to a load. In addition, the cylinder 41 includes a second rod 51 that is disposed in the second chamber 55. A first end 52 of the second rod 51 is connected to the side of the piston 45 that is opposed to the one side, and a second end 53 of the second rod 51 is configured to be connected to a load. In some embodiments, the first and second rods 48, 51 are connected to the same load. In other embodiments, the first rod 48 is connected to a first load and the second rod 51 is connected to a second load that is different from the first load.

The speed and direction of the actuator 40 is a function of the angular velocity of the electric motor 11, and the displacement of the pump 12.

The actuator 40 is linear actuator that is configured to provide a motion that oscillates between an advancing stroke in a first direction (see arrow 56) and a retracting stroke in second direction (see arrow 58) that is opposed to the first direction. With reference to FIG. 1, the advancing stroke corresponds to movement of the piston 45 within the cylinder housing 42 in the first direction 56, e.g., movement from the A side to the B side, or movement from left to right with respect to the orientation shown in FIG. 1. The retracting stroke corresponds to movement of the piston 45 within the cylinder housing 42 in the second direction 58, e.g., movement from the B side to the A side, or movement from right to left with respect to the orientation shown in FIG. 1. In addition, the actuator 40 is configured to be connected to a load in each of the advancing stroke and the retracting stroke, the motion achieved via hydraulic fluid provided by the prime mover 10 via the first and second fluid lines 3, 4.

In an arrangement in which the reclamation device 80 is omitted from the hydraulic circuit 2, as the actuator 40 is advanced (e.g., the piston 45 moves from the A side to the B side), pressure builds in the first fluid line 3 which connects the prime mover A port 13 to the actuator A port 43.

As the piston 45 is advanced, the volume of the first chamber 54 increases, and the amount of hydraulic fluid in the system, e.g., the system volume $V_{system}$, increases proportionally to the increased volume of the first chamber 54 due to the movement of the piston 45 within the cylinder housing 42. In order to move the load, the volume added to chamber 54 must be at a relatively higher pressure $P_s$. The prime mover 10 is adding the volume of fluid to the hydraulic circuit 2 as well as raising the hydraulic circuit pressure from the minimum pressure $P_{min}$ to the higher pressure $P_s$. Thus, for each position of the cylinder, a volume of fluid equal to the minimum volume $V_{min}$ must be drawn from the pump port 12B and compressed to a system volume $V_{system}$ at the pump port 12A. In the case where the system volume $V_{system}$ of chamber 55 is less than or equal to that of the first chamber 54, the extra fluid must come from the main accumulator 15.

As the actuator 40 reaches the B-side reversal position of the piston stroke, the system volume $V_{system}$ of the first chamber 54 is larger than the system volume $V_{system}$ of the second chamber 55. In order to reverse the actuator 40 and do work in the opposite direction, the first chamber 54 needs to be lowered to near the minimum pressure $P_{min}$ and the second chamber 55 needs to be raised to the higher pressure $P_s$. Due to the unequal volumes of the first and second chambers 54, 55, the additional compressed volume $V_c$ for the second chamber 55 is lower than the additional compressed volume $V_c$ contained in the first chamber 54. This means the pressure reversal cannot be achieved by simply moving the additional compressed volume $V_c$ of the second chamber 55 to the first chamber 54. If the additional compressed volume $V_c$ in the first chamber 54 is not bled off or displaced, the pressure in the first chamber 54 will not approach the minimum $P_{min}$. Since the pressure in the first chamber 54 opposes the pressure in the second chamber 55, the required higher pressure $P_s$ for the second chamber 55 would increase relative to the amount of residual pressure above the minimum $P_{min}$ remaining in the first chamber 54 for a given load. When this required higher pressure $P_s$ is greater than the maximum allowable pressure for circuit 2, the result is hydraulic lock.

To avoid hydraulic lock, during the retracting stroke, the pressure in the first chamber 54 must be reduced from the higher pressure $P_s$ to near the minimum pressure $P_{min}$. This can only be accomplished by allowing the fluid in the first chamber 54 to expand to a minimum volume $V_{min}$. In the hydraulic circuit that omits the reclamation device 80, the expansion can be achieved by bleeding off the corresponding hydraulic fluid, whereby the associated compression energy is wasted. Once the first chamber 54 is decompressed, the force generated in the second chamber 55 can then exceed the force generated in the first chamber 54 by an amount large enough to move the load, allowing the actuator 40 to reverse directions and perform the retracting stroke.

The same holds true during the reversing stroke (e.g., when the piston 45 moves from the B side to the A side). As the actuator 40 is retracted, pressure builds in in the second fluid line 4 which connects the prime mover B port 14 to the actuator B port 44. The volume of the second chamber 55 increases, and the amount of hydraulic fluid ($V_{system}$) added to the second chamber 55 increases proportionally to the increased volume of the second chamber 55 due to the movement of the piston 45 within the cylinder housing 42. In order to move the load, the volume added to the second chamber 55 must be at a higher pressure $P_s$. The prime mover 10 adds the corresponding volume of fluid and raises the pressure of the second chamber 55 from the minimum pressure $P_{min}$ to the higher pressure $P_s$. Thus, for a given position of the piston 45 within the cylinder housing 42, a volume of fluid equal to the minimum volume $V_{min}$ must be drawn from the pump A port 12A and compressed to a system volume $V_{system}$ at the pump B port 12 B. In the case where the system volume $V_{system}$ of the first chamber 54 is less than or equal to the system volume $V_{system}$ of the second chamber 55, the extra fluid must come from the main accumulator 15.

As the actuator 40 reaches the A-side reversal position of the piston stroke, the system volume $V_{system}$ of the second chamber 55 is larger than the system volume $V_{system}$ of the first chamber 54. In order to reverse the actuator 40 and do work in the opposite direction, the pressure in the second chamber 55 needs to be lowered to near the minimum pressure $P_{min}$ and the pressure in the first chamber 54 needs to be raised to the higher pressure $P_s$. Due to the unequal volumes of the first and second chambers 54, 55, the additional compressed volume $V_c$ for the first chamber 54 is lower than the additional compressed volume $V_c$ contained in the second chamber 55. This means the pressure reversal cannot be achieved by simply moving the additional compressed volume $V_c$ of the first chamber 54 to the second chamber 55. If the additional compressed volume $V_c$ in the second chamber 55 is not bled off or displaced, the pressure in the second chamber 55 will not approach the minimum pressure $P_{min}$. Since the pressure in the second chamber 55 opposes the pressure in the first chamber 54, the required higher pressure $P_s$ for the first chamber 54 would increase relative to the amount of residual pressure above the minimum pressure $P_{min}$ remaining in the second chamber 55 for a given load. When the required higher pressure $P_s$ is greater than the maximum allowable pressure for the hydraulic circuit 2, the result is hydraulic lock.

In the illustrated embodiment, the reclamation device 80 is disposed in the hydraulic circuit 2 between the prime mover 10 and the actuator 40. The reclamation device 80 is configured to capture and store hydraulic fluid displaced from the actuator 40 during operation of the prime mover 10. In particular, the reclamation device 80 is configured to allow for an expansion in the volume of the first and second chambers 54, 55 from the system volume $V_{system}$ to near the minimum volume $V_{min}$ allowing for a reduction in pressure in each chamber from the higher pressure $P_s$ to a predetermined pressure near the minimum pressure $P_{min}$.

The reclamation device 80 includes a first reclamation module 81 and a second reclamation module 88. The first reclamation module 81 is connected to the first fluid line 3 via a first branch line 5. The first branch line 5 is connected to the first fluid line 3 at a location between the prime mover A port 13 and the actuator A port 43.

The first reclamation module 81 includes a first reclamation accumulator 82 that is connected to a terminus of the first branch line 5, and a first control valve 83 that is disposed in the first branch line 5 between the first reclamation accumulator 82 and the first fluid line 3.

The second reclamation module 88 is connected to the second fluid line 4 via a second branch line 6. The second branch line 6 is connected to the second fluid line 4 at a location between the prime mover B port 14 and the actuator B port 44.

The second reclamation module 88 includes a second reclamation accumulator 89 that is connected to a terminus of the second branch line 6, and a second control valve 90 disposed in the second branch line 6 between the second reclamation accumulator 89 and the second fluid line 4.

In some embodiments, the electric motor 11 and the valves 19, 20, 22, 23, 83, 90 may be controlled by a general purpose programmable controller (not shown) such as a programmable logic controller (PLC). The PLC may include input modules or points, a central processing unit (CPU) and output modules or points. The PLC receives information from connected input devices and sensors, processes the received data, and triggers required outputs per its pre-programmed instructions. Instructions carried out by the PLC may be provided by a programming device or stored in a non-volatile PLC memory.

In the hydraulic circuit 2 including the reclamation device 80, as the actuator 40 is advanced, the piston 45 moves from the A side to the B side within the cylinder housing 42. As the piston 45 moves, the first control valve 83 is closed, and second control valve 90 is open, and pressure builds in the first fluid line 3 between the prime mover A port 13 and the actuator A port 43.

As the piston 45 is advanced, the system volume $V_{system}$ of the first chamber 54 increases, and thus the corresponding additional compressed volume $V_c$ of the first chamber 54 increases, requiring a minimum volume $V_{min}$ of fluid to be drawn from the pump B port 12B and to be compressed into the first chamber 54. Both the system volume $V_{system}$ and the additional compressed volume $V_c$ increase, and therefore the minimum volume $V_{min}$ increase proportionally to the increased volume of the first chamber 54 due to the movement of the piston 45 within the cylinder housing 42.

As the actuator 40 reaches the B-side reversal position of the piston stroke, a volume equal to the minimum volume $V_{min}$ has been compressed to a system volume $V_{system}$ from a minimum pressure $P_{min}$ to a higher pressure $P_s$. After the advancing motion stops, but prior to reversal, the second control valve 90 is closed, and the first control valve 83 is opened, allowing expansion of the volume in the first chamber 54 into device 82. The minimum pressure of the first reclamation accumulator 82 is the minimum pressure $P_{min}$, and the first reclamation accumulator 82 is properly sized with a ratio of gas to fluid to allow the system volume $V_{system}$ of the first chamber 54 to increase, thus decreasing the pressure in the first chamber 54 to a nominal value higher than the minimum pressure $P_{min}$, but low enough to avoid hydraulic lock. The increase in the system volume $V_{system}$ corresponds to the additional compressed volume $V_c$ added to the first chamber 54 during the advancing stroke and thus $V_{system}$ is very near the minimum volume $V_{min}$. Due to the compressibility of the fluid, this volume expansion results in a pressure reduction to very near the minimum pressure $P_{min}$ chamber 54. The pump 12 pauses momentarily while the first chamber 54 is decompressing. When the pressure of the first fluid line 3 has stabilized to the desired nominal value, the prime mover 10 restarts, directing fluid to the prime mover B port 14, and the actuator 40 can reverse due to higher force developing in the second chamber 55. The second control valve 90 remains open as the piston 45 moves through the retracting stroke allowing use of the stored energy in the first reclamation accumulator 82 by supplying the additional compressed volume $V_c$ in the second chamber 55 from the accumulator rather than the auxillary charge pump 30.

As the piston 45 retracts, the system volume $V_{system}$ of the second chamber 55 increases, and the corresponding additional compressed volume $V_c$ also increases. While the reclamation device pressure of the first reclamation accumulator 82 remains higher than the minimum pressure $P_{min}$, any additional compressed volume $V_c$ for the second chamber 55 will be supplied from the first reclamation accumulator 82.

As the actuator 40 reaches the A-side reversal position of the piston stroke, the system volume $V_{system}$ of the second chamber 55 approaches its maximum value and thus requires the maximum value of the additional compressed volume $V_c$ for the second chamber 55. The increasing volume in the second chamber 55 thus consumes the energy stored in the first reclamation accumulator 82 as the piston 45 moves from the B side to the A side within the cylinder housing 42. This energy consumption is realized via a reduction in the required volume of fluid necessary to provide to the circuit via charge pump 30. When the pressure in the first reclamation accumulator 82 has been reduced to the desired nominal value (e.g., corresponding to the pressure provided by the charge pump 30, e.g., the minimum pressure $P_{min}$), the energy stored in the first reclamation accumulator 82 has been exhausted and the first control valve 83 is closed.

The same holds true for the subsequent advancing movement of the piston 45 from the A side to the B side (right to left, e.g., the subsequent retracting movement). After motion from the B side toward the A side stops, but prior to reversal, the first control valve 83 remains closed and the second control valve 90 is opened, allowing decompression of the second chamber 55 via flow of hydraulic fluid from the second chamber 55 into the second reclamation accumulator 89 an amount corresponding to the additional compressed volume $V_c$. The pump 12 pauses momentarily while the second chamber 55 is decompressing. When the pressure of the second fluid line 4 has stabilized to the desired nominal value higher than but near the minimum pressure $P_{min}$, the prime mover 10 restarts, directing fluid from the prime mover A port 13, and the actuator 40 can reverse due to higher force developing in the first chamber 54. The second control valve 90 remains open as the piston 45 moves through the advancing stroke.

An increasing volume in the first chamber 54 also increases the first chamber additional compressed volume $V_c$, which will consume the energy stored in the second reclamation accumulator 89 as the piston 45 advances from the A side to the B side. This energy consumption is realized via a reduction in torque on the motor 11 resulting from the elevated pressure on the accumulator B port 44. When the pressure of the second reclamation accumulator 89 has been reduced to the desired nominal value, the stored energy has been exhausted and the second valve 90 can be closed.

The reclamation device 80 thus allows a volume increase on the side of the actuator 40 having a trapped volume of hydraulic fluid, reducing its pressure to a nominal value and simultaneously capturing a portion of the potential energy stored within the compressed fluid, prior to reversal. In addition, the reclamation device 80 also reduces hydraulic shock associated with rapid decompression. At the time of each reversal of the piston 45 within the cylinder housing 42, hydraulic circuit pressures are first reduced through the decay of pressure associated with the additional compressed volume $V_c$ into the corresponding one of the first and second reclamation modules 81, 88.

A variant that can save more energy than the above-described system, but relies on the ability to elevate the sum of the pressures on the prime mover A and B ports 13, 14 can be achieved by reversing the actions of the first and second control valves 83, 90 and elevating the pre-charge in the first and second reclamation accumulators 82, 89 to a value very near the higher pressure $P_s$. Operation of the variant is as follows.

As the actuator 40 moves toward the B-side reversal position, the first control valve 83 is open and the second control valve 90 is closed. As the actuator 40 reaches the B-side reversal position of the piston stroke, a volume equal to the minimum volume $V_{min}$ has been compressed to a system volume $V_{system}$ from a minimum pressure $P_{min}$ to a higher pressure $P_s$. After the advancing motion stops, but prior to reversal, the first control valve 83 is closed and the second control valve 90 is opened. This will equalize the pressure in the fluid line 4 to a pressure slightly less than the higher pressure $P_s$ due to fluid entering the system from 82. Reversal of the prime mover 10 will permit decompression of the first chamber 54. This will cause a rise in pressure in the second chamber 55 and a lowering of pressure in the first chamber 54. The second reclamation accumulator 89 is sized with a ratio of gas to fluid that is sufficient to allow a fluid volume of near equal to the additional compressed volume $V_c$ of the first chamber 54 to pass into the second reclamation accumulator 89. The second reclamation accumulator 89 is designed so that the pressure in the second chamber 55 can rise sufficiently above the pressure in the first chamber 54 to permit movement without exceeding the maximum system pressure, thus avoiding hydraulic lock. When the pressure in the second chamber 55 is sufficiently above the pressure in the first chamber 54, the actuator 40 will begin to move in the opposite direction. Allowing the volume expansion to occur on the high pressure side allows for transfer of the additional compressed volume $V_c$ from the first chamber 54 to the second chamber 55 at the lowest possible pressure delta across prime mover 10. The second control valve 90 remains open as the piston 45 moves through the retracting stroke. As the piston 45 moves, the energy stored in the second reclamation accumulator 89 is used to assist in movement of the piston 45 from B to A, in this way allowing use of the stored energy in the second reclamation accumulator 89.

In the variant, as the actuator 40 reaches the A-side reversal position of the piston stroke, the pressure in the first chamber 54 equals the minimum pressure $P_{min}$, thus reducing the required pressure in the second chamber 55 to the higher pressure $P_s$. When the second chamber 55 is operating at nominal higher pressure $P_s$ the second control valve 90 can be closed and all the stored energy has been used. In this application, the energy savings is accomplished by transferring the energy used to compress the fluid in the first chamber 54 to the second reclamation accumulator 89 at reversal at a low pressure drop across prime mover 10, thus reducing the torque on motor 11 required to move the potential energy from prime mover A port 13 to the prime mover B port 14.

The same holds true for the subsequent advancing movement of the piston 45 from the A side to the B side (right to left, e.g., the subsequent retracting movement). After the retracting motion from the B side toward the A side stops, but prior to reversal, the first control valve 83 is opened and the second control valve 90 remains closed, causing the pressures in the first and second chamber 54, 55 to come nearly to equilibrium. When the pressure of the second fluid line 4 has stabilized to the desired nominal value near the higher pressure $P_s$, the prime mover 10 restarts, directing fluid to the prime mover A port 13. This allows the prime mover 10 to transfer the additional compressed volume $V_c$ of fluid from the B side to the A side, beginning at near equal pressures and ending at a pressure drop sufficient to move the load in the opposite direction. Thus allowing transfer of the additional compressed volume $V_c$ from one side of the hydraulic circuit 2 to the other side at the lowest possible pressure drop. The actuator 40 can reverse due to higher force developing in the first chamber 54. The first control valve 83 remains open as the piston 45 moves through the advancing stroke.

An increasing volume in the first chamber 54 also increases the first chamber additional compressed volume $V_c$, which will consume the remaining additional compressed volume $V_c$ in the second chamber 55 and finally lowering the second chamber pressure to the minimum pressure $P_{min}$. As the second chamber 55 reaches the minimum pressure $P_{min}$ the required pressure in the first chamber chamber 54 will reach the nominal higher pressure $P_s$. As the required pressure in the first chamber 54 is lower, fluid will exit the first reclamation accumulator 82, consuming the stored energy in the first reclamation accumulator 82. This energy consumption is realized via a decrease in the pressure drop at which the additional compressed fluid $V_c$ is compressed into the active chamber. When the pressure of the first reclamation accumulator 82 has been reduced to the desired nominal value, the stored energy has been exhausted and the first valve 83 can be closed.

The reclamation device 80 thus allows a volume increase on the side of the actuator 40 having a lower system volume $V_{system}$, allowing for transfer of high pressure additional compressed volume $V_c$ from one working port to the other, simultaneously capturing a portion of the potential energy stored within the compressed fluid, upon reversal. In addition, the reclamation device 80 also reduces hydraulic shock associated with rapid decompression. At the time of each reversal of the piston 45 within the cylinder housing 42, hydraulic circuit pressures are first equalized and then the additional compressed volume $V_c$ is transferred into the corresponding one of the first and second reclamation modules 81, 88.

Although the hydraulic system 1 includes the reclamation device 80 disposed in the hydraulic circuit 2 between the prime mover 10 and the actuator 40, the hydraulic system 1 and the hydraulic circuit 2 are not limited to employing the specific embodiments of the prime mover 10 and the actuator 40 that are illustrated in FIG. 1. It is understood that other prime movers and actuators may be substituted for the prime mover 10 and the actuator 40 illustrated in FIG. 1 as long as the resulting hydraulic system 1 generates an oscillating motion and is configured to be connected to a load in both directions of the oscillating motion. Three non-limiting examples of alternative embodiment hydraulic systems that include the reclamation device 80 will now be described with reference to FIGS. 2-5.

Figure 2:
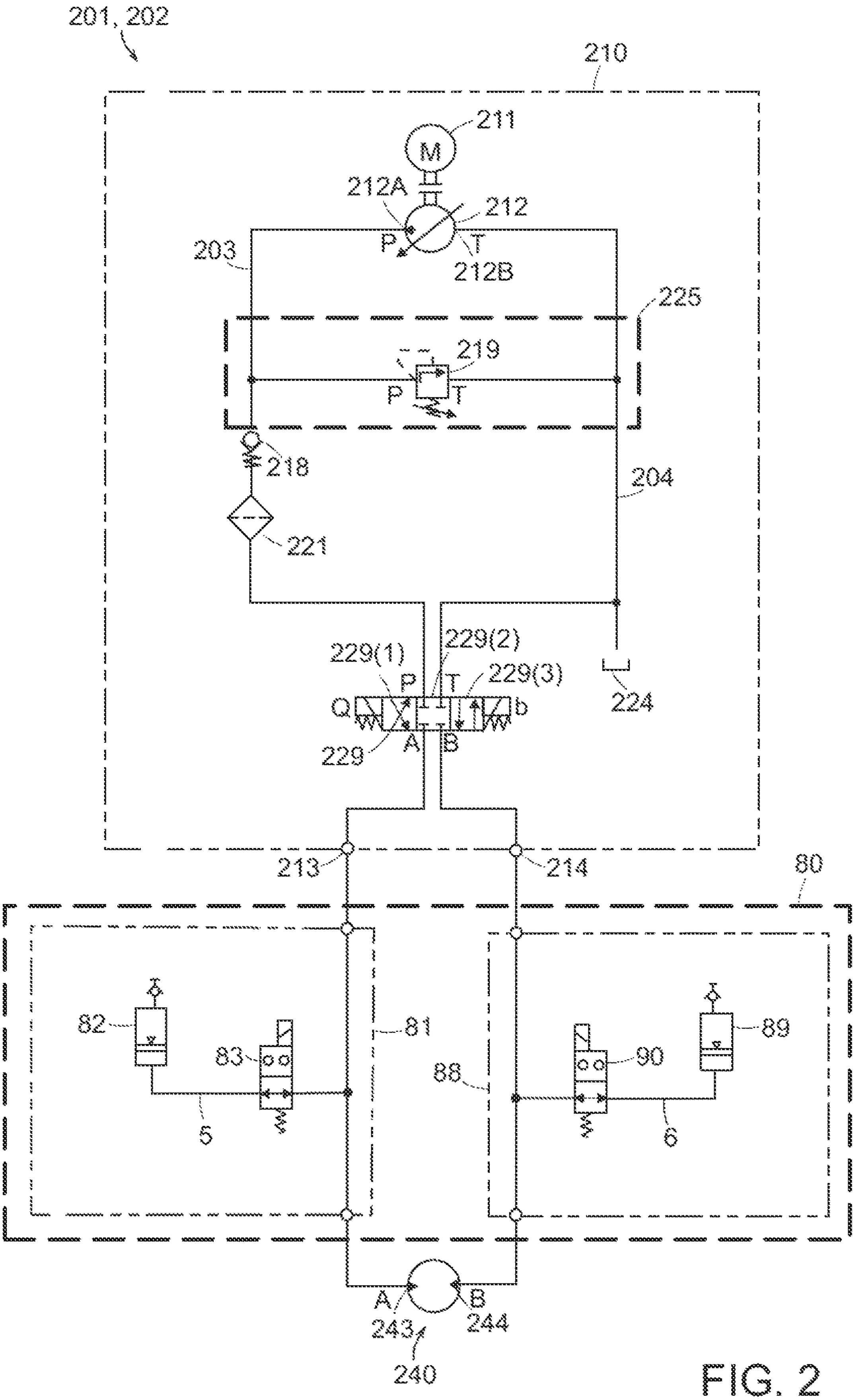
FIG. 2 is a schematic diagram of an alternative embodiment hydraulic circuit employed in an oscillating hydraulic system.
Figure 3:
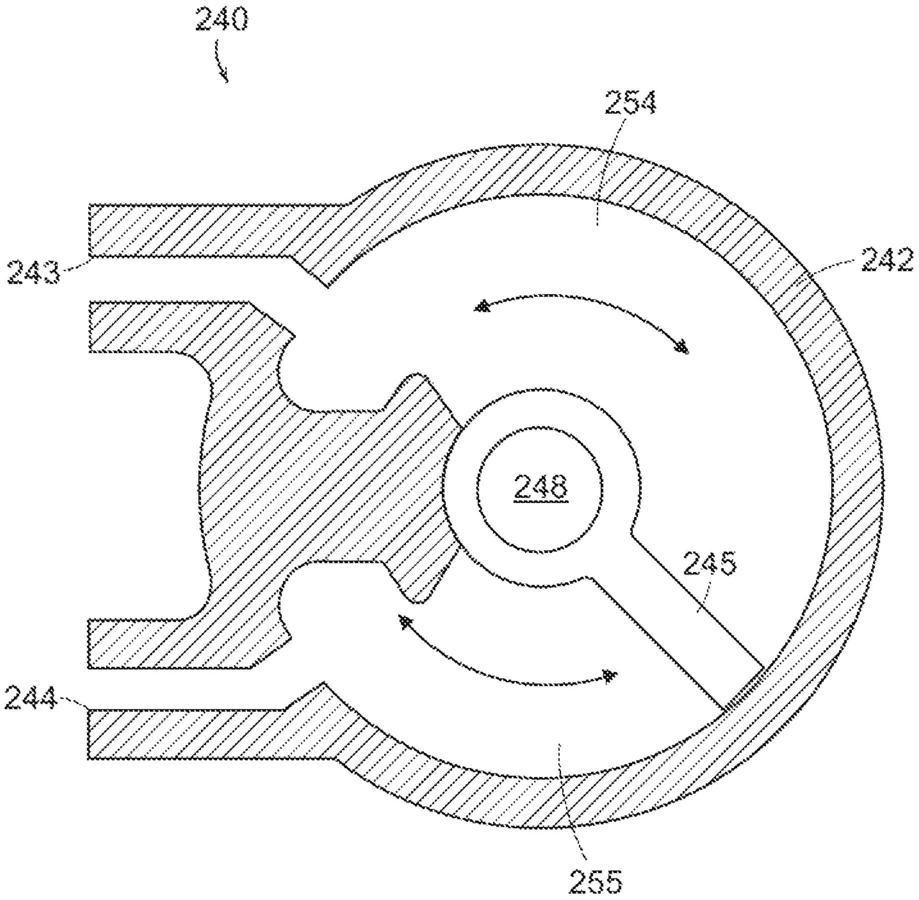
FIG. 3 is a side cross-sectional view of a single-vane rotary actuator.

Referring to FIGS. 2 and 3, an alternative embodiment hydraulic system 201 includes a hydraulic circuit 202. The hydraulic circuit 202 includes an alternative embodiment actuator 240 that performs work, and an alternative embodiment prime mover 210 that creates an oscillating flow of hydraulic fluid and controls the flow of hydraulic fluid to the actuator 240. The hydraulic circuit 202 also includes the reclamation device 80 disposed in the hydraulic circuit 202 between the prime mover 210 and the actuator 240. The reclamation device 80 permits the oscillating hydraulic system 201 to avoid hydraulic lock and to capture decompression energy for subsequent use by the hydraulic system 201.

The prime mover 210 includes a variable speed, single-single direction pump 212 that is driven by a constant speed electric motor 211. The electric motor 211 controls the direction of the pump 212. The pump 212 includes a pump A port 212A that is connected to the prime mover A port 213 and an A port 243 of the actuator 240 via a first fluid line 203 of the hydraulic circuit 202. In addition, the pump 212 includes a pump B port 212B that is connected to the prime mover B port 214 and a B port 244 of the actuator 240 via a second fluid line 204. The pump B port 212B is connected to a reservoir 224, and the pump 212 directs hydraulic fluid from the pump A port 212A toward the prime mover A port 213 via a check valve 218 and a filter 221.

The prime mover 210 includes a pressure relief device 225 that is connected to the first and second fluid lines 203, 204, and thus to the pump 212. The pressure relief device 225 includes an adjustable pressure relief valve 219 that is configured to prevent damage to circuit components due to over-pressurization of the hydraulic circuit 202.

The prime mover 210 may also include a constant pressure source (not shown) such as a main accumulator or charge pump.

The prime mover 210 includes a control valve 229 that is connected to the first and second fluid lines 203, 204 in parallel to the pressure relief device 219. The control valve 229 is connected to the first and second fluid lines 203, 204 at a location between the pressure relief device 229 and the prime mover A and B ports 213, 214. The control valve 229 is a three-position, double-solenoid control valve. The control valve 229 includes a first position 229(1), a second position 229(2) and a third position 229(3). In the first position 229(1), hydraulic fluid from the pump A port 212A via fluid line 203 is directed to the actuator B port 244 via the prime mover B port 214, and hydraulic fluid from the actuator A port 243 via the prime mover A port 213 is directed to the pump B port 212B. In the second position 229(2), the control valve has all ports closed, and no fluid flows between the pump 212 and the A and B ports of the prime mover 210. In the third position 229(3), hydraulic fluid from the pump A port 212A via fluid line 203 is directed to the actuator A port 243 via the prime mover A port 213, and hydraulic fluid from the actuator B port 244 via the prime mover B port 214 is directed to the pump B port 212B.

The actuator 240 is a rotary actuator such as, but not limited to, a single- or double-vane rotary actuator. In the case of a single-vane rotary actuator, the actuator 240 may include a housing 242, and a vane 245 that is disposed in the housing 242. The vane 245 forms a seal with the housing 245 and segregates an interior space of the housing 242 into a first chamber 254 that includes the actuator A port 243 and a second chamber 255 that includes the actuator B port 244. The actuator 240 includes a rod 248 that is connected to the vane 245 and protrudes from the housing 245. Movement of the vane 245 within the housing due to unequal pressure between the first and second chambers 254, 255 results in rotation of the rod 248. Oscillation of hydraulic fluid between the first and second chambers 254, 255 results in an oscillating rotational motion of the rod 248. Thus, the actuator 240 is a rotary actuator that is configured to provide motion that oscillates between rotation in a first direction and rotation in a second direction that is opposite the first direction.

The reclamation device 80 is disposed in the hydraulic circuit 202 between the prime mover 210 and the actuator 240. In particular, the first reclamation module 81 is connected to the first fluid line 203 via the first branch line 5. The first branch line 5 is connected to the first fluid line 203 at a location between the prime mover A port 213 and the actuator A port 243. The second reclamation module 88 is connected to the second fluid line 204 via the second branch line 6. The second branch line 6 is connected to the second fluid line 204 at a location between the prime mover B port 214 and the actuator B port 244.

The reclamation device 80 thus allows a volume increase on the side of the actuator 240 having a trapped volume of hydraulic fluid, reducing its pressure to a nominal value and simultaneously capturing a portion of the potential energy stored within the compressed fluid, prior to reversal. In addition, the reclamation device 80 also reduces hydraulic shock associated with rapid decompression. At the time of each reversal of the vane 245 within the housing 242, hydraulic circuit pressures are first reduced through the decay of pressure associated with the additional compressed volume $V_c$ into the corresponding one of the first and second reclamation modules 81, 88.

Figure 4:
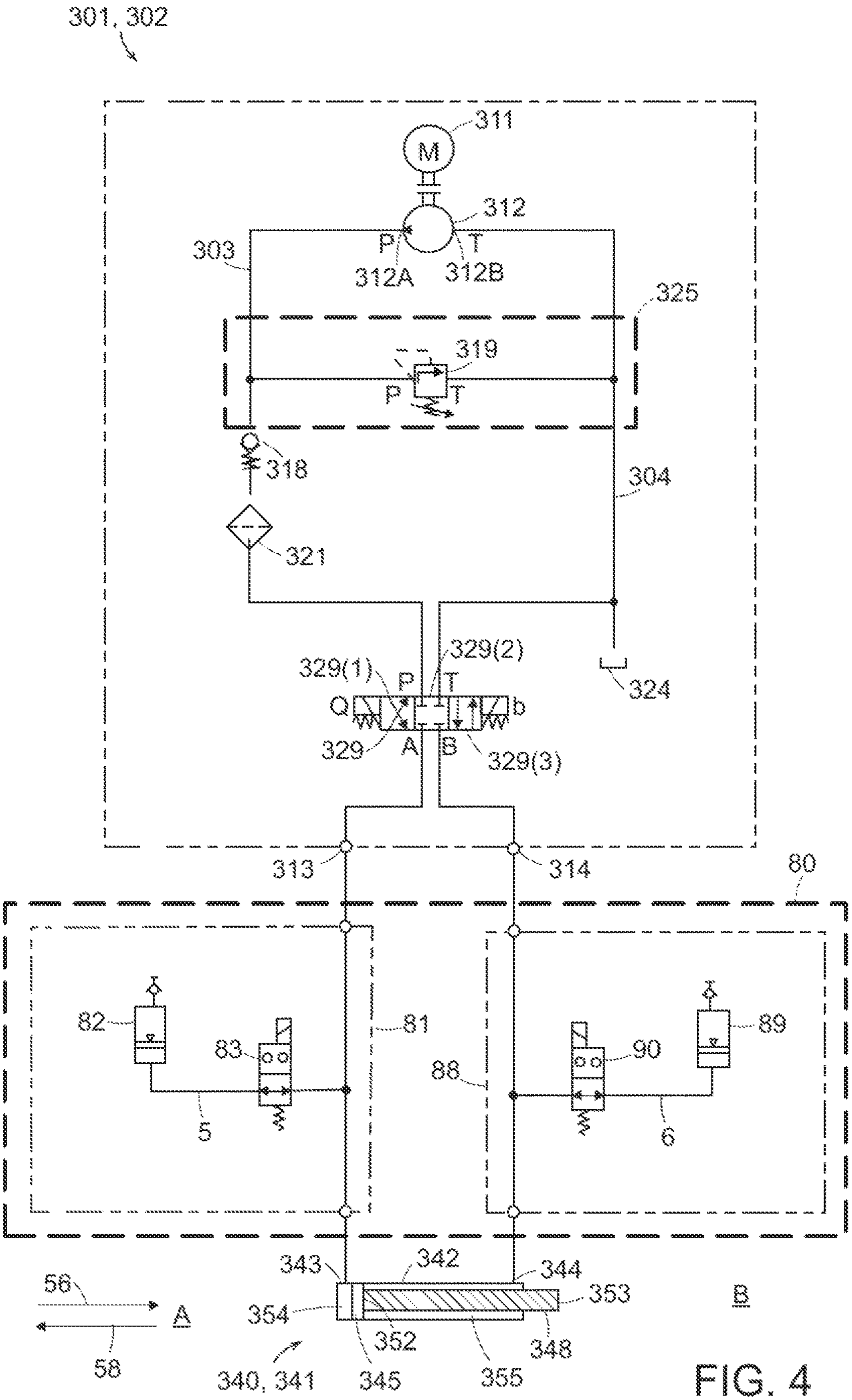
FIG. 4 is a schematic diagram of another alternative embodiment hydraulic circuit employed in an oscillating hydraulic system.

Referring to FIG. 4, another alternative embodiment hydraulic system 301 includes a hydraulic circuit 302. The hydraulic circuit 302 includes an alternative embodiment actuator 340 that performs work, and an alternative embodiment prime mover 310 that creates an oscillating flow of hydraulic fluid and controls the flow of hydraulic fluid to the actuator 340. The hydraulic circuit 302 also includes the reclamation device 80 disposed in the hydraulic circuit 302 between the prime mover 310 and the actuator 340. The reclamation device 80 permits the oscillating hydraulic system 301 to avoid hydraulic lock and to capture decompression energy for subsequent use by the hydraulic system 301.

The prime mover 310 includes a constant speed, single-direction pump 312 that is driven by a constant speed electric motor 311. The electric motor 311 controls the speed of the pump 312. The pump 312 includes a pump A port 312A that is connected to the prime mover A port 313 and an A port 343 of the actuator 340 via a first fluid line 303 of the hydraulic circuit 302. In addition, the pump 312 includes a pump B port 312B that is connected to the prime mover B port 314 and a B port 344 of the actuator 340 via a second fluid line 304. The pump B port 312B is connected to a reservoir 324, and the pump 312 directs hydraulic fluid from the pump A port 312A toward the prime mover A port 313 via a check valve 318 and a filter 321.

The prime mover 310 includes a pressure relief device 325 that is connected to the first and second fluid lines 303, 304, and thus to the pump 312. The pressure relief device 325 includes an adjustable pressure relief valve 319 that is configured to prevent damage to circuit components due to over-pressurization of the hydraulic circuit 302.

The prime mover 310 includes a control valve 329 that is connected to the first and second fluid lines 303, 304 in parallel to the pressure relief device 325. The control valve 329 is connected to the first and second fluid lines 303, 304 at a location between the pressure relief device 329 and the prime mover A and B ports 313, 314. The control valve 329 is a three-position, double-solenoid control valve. The control valve 329 includes a first position 329(1), a second position 329(2) and a third position 329(3). In the first position 329(1), hydraulic fluid from the pump A port 312A via fluid line 303 is directed to the actuator B port 344 via the prime mover B port 314, and hydraulic fluid from the actuator A port 343 via the prime mover A port 313 is directed to the pump B port 312B. In the second position 329(2), the control valve is has all ports closed, and no fluid flows between the pump 312 and the A and B ports of the prime mover 310. In the third position 329(3), hydraulic fluid from the pump A port 312A via fluid line 303 is directed to the actuator A port 343 via the prime mover A port 313, and hydraulic fluid from the actuator B port 344 via the prime mover B port 314 is directed to the pump B port 312B.

The actuator 340 is differential area, single-rod hydraulic cylinder 341 that includes a cylinder housing 342, a piston 345 that is disposed in the cylinder housing 342. The piston 345 forms a seal with the cylinder housing 342 and segregates an interior space of the cylinder housing 342 into a first chamber 354 that includes the actuator A port 343 and a second chamber 355 that includes the actuator B port 344. The cylinder 341 includes a rod 348 disposed in the second chamber 355. A first end 352 of the rod 348 is connected to the side of the piston 345 that faces the second chamber 355, and a second end 353 of the rod 348 is configured to be connected to a load.

The speed of the actuator 340 is a function of the angular velocity of the electric motor 311, and the displacement of the pump 312. The direction of the actuator 340 is a function of the control valve 329.

The actuator 340 is linear actuator that is configured to provide a motion that oscillates between an advancing stroke in a first direction (see arrow 56) and a retracting stroke in second direction (see arrow 58) that is opposed to the first direction. With reference to FIG. 4, the advancing stroke corresponds to movement of the piston 345 within the cylinder housing 342 in the first direction 56, e.g., from the A side to the B side with respect to the orientation shown in FIG. 4. The retracting stroke corresponds to movement of the piston 345 within the cylinder housing 342 in the second direction 58, e.g., from the B side to the A side with respect to the orientation shown in FIG. 4. In addition, the actuator 340 is configured to be connected to a load in each of the advancing stroke and the retracting stroke, the motion achieved via hydraulic fluid provided by the prime mover 310 via the first and second fluid lines 303, 304.

The reclamation device 80 is disposed in the hydraulic circuit 302 between the prime mover 310 and the actuator 340. In particular, the first reclamation module 81 is connected to the first fluid line 303 via the first branch line 5. The first branch line 5 is connected to the first fluid line 303 at a location between the prime mover A port 313 and the actuator A port 343. The second reclamation module 88 is connected to the second fluid line 304 via the second branch line 6. The second branch line 6 is connected to the second fluid line 304 at a location between the prime mover B port 314 and the actuator B port 344.

The reclamation device 80 thus allows a volume increase on the side of the actuator 340 having a trapped volume of hydraulic fluid, reducing its pressure to a nominal value and simultaneously capturing a portion of the potential energy stored within the compressed fluid, prior to reversal. In addition, the reclamation device 80 also reduces hydraulic shock associated with rapid decompression. At the time of each reversal of the piston 345 within the cylinder housing 342, hydraulic circuit pressures are first reduced through the decay of pressure associated with the additional compressed volume $V_c$ into the corresponding one of the first and second reclamation modules 81, 88.

Figure 5:
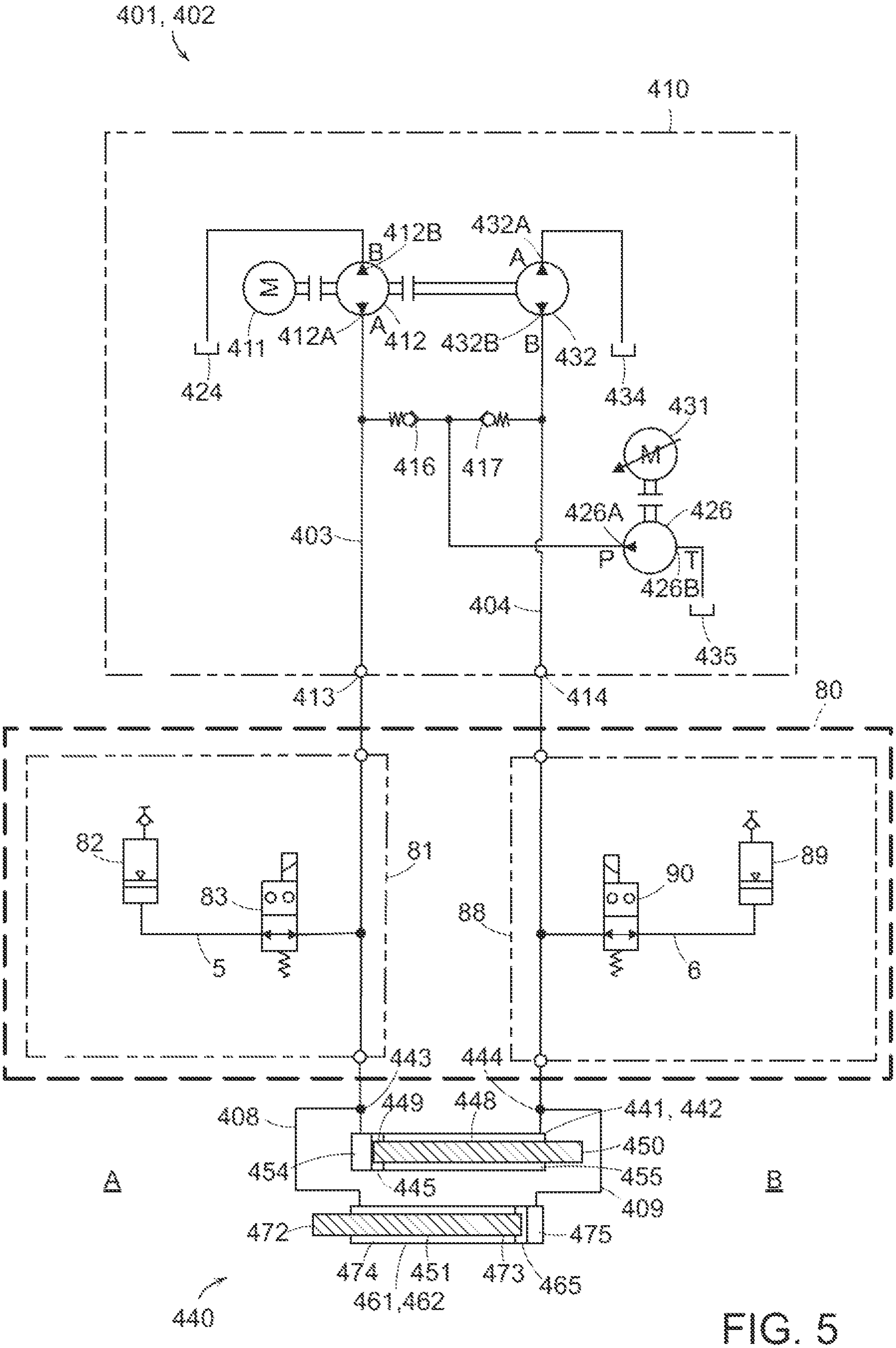
FIG. 5 is a schematic diagram of another alternative embodiment hydraulic circuit employed in an oscillating hydraulic system.

Referring to FIG. 5, another alternative embodiment hydraulic system 401 includes a hydraulic circuit 402. The hydraulic circuit 402 includes an alternative embodiment actuator 440 that performs work, and an alternative embodiment prime mover 410 that creates an oscillating flow of hydraulic fluid and controls the flow of hydraulic fluid to the actuator 440. The hydraulic circuit 402 also includes the reclamation device 80 disposed in the hydraulic circuit 402 between the prime mover 410 and the actuator 440. The reclamation device 80 permits the oscillating hydraulic system 401 to avoid hydraulic lock and to capture decompression energy for subsequent use by the hydraulic system 401.

The prime mover 410 includes a first pump 412 and a second pump 432. The first and second pumps 412, 432 are each constant speed, bi-directional pumps, and are each driven by a common constant speed electric first motor 411. For example, the first and second pumps 412, 432 may both be connected to an output shaft of the electric motor 411. The electric motor 411 controls the speed and direction of the first pump 412 and second pump 432.

The first pump 412 includes a pump A port 412A that is connected to the prime mover A port 413 and an A port 443 of the actuator 440 via a first fluid line 403 of the hydraulic circuit 402. In addition, the first pump 412 includes a pump B port 412B that is connected to a first reservoir 424.

The second pump 432 includes a pump A port 432A that is connected to a second reservoir 434, and a pump B port 432B that is connected to the prime mover B port 414 and a B port 444 of the actuator 440 via a second fluid line 404.

The prime mover 410 includes a charge pump 426 that is driven by a variable speed electric second motor 431. The charge pump 426 is a constant speed, single-direction pump. The charge pump 426 includes a pump A port 426A that is connected to the first and second fluid lines 403, 404 via respective check valves 416, 417. The second motor 431 controls the speed of the charge pump 426 and resultant flow from the charge pump 426 via pump A port 426A. In addition, the charge pump 426 includes a pump B port 426B that is connected to a third reservoir 435.

In some embodiments the first, second and third reservoirs 424, 434, 435 are separate from each other, while in other embodiments, the first, second and third reservoirs 424, 434, 435 are a single, common reservoir.

In some embodiments, the prime mover 410 may also include a pressure relief device (not shown), a filter (not shown) and/or other ancillary components that facilitate efficient operation of the prime mover 410.

The actuator 440 comprises a pair of hydraulic cylinders 441, 461 that are connected in parallel. Specifically, the actuator 440 includes a differential area, single-rod hydraulic first cylinder 441 and a differential area, single-rod hydraulic second cylinder 461.

The first cylinder 441 includes a first cylinder housing 442, a first piston 445 that is disposed in the first cylinder housing 442. The first piston 445 forms a seal with the first cylinder housing 442 and segregates an interior space of the first cylinder housing 442 into a first chamber 454 that is connected to the actuator A port 443 and a second chamber 455 that is connected to the actuator B port 444. The first cylinder 441 includes a first rod 448 disposed in the second chamber 455. A first end 449 of the first rod 448 is connected to the side of the first piston 445 that faces the second chamber 455, and a second end 450 of the first rod 448 is configured to be connected to a load.

The second cylinder 461 includes a second cylinder housing 462, a second piston 465 that is disposed in the second cylinder housing 462. The second piston 465 forms a seal with the second cylinder housing 462 and segregates an interior space of the second cylinder housing 362 into a third chamber 474 that is connected to the actuator A port 443 via a third fluid line 408, and a fourth chamber 475 that is connected to the actuator B port 444 via a fourth fluid line 409. The second cylinder 461 includes a second rod 471 disposed in the third chamber 474. A first end 472 of the second rod 471 is connected to the side of the second piston 265 that faces the third chamber 474, and a second end 473 of the second rod 471 is configured to be connected to a load.

The reclamation device 80 is disposed in the hydraulic circuit 402 between the prime mover 410 and the actuator 440. In particular, the first reclamation module 81 is connected to the first fluid line 403 via the first branch line 5. The first branch line 5 is connected to the first fluid line 403 at a location between the prime mover A port 313 and the actuator A port 343. The second reclamation module 88 is connected to the second fluid line 404 via the second branch line 6. The second branch line 6 is connected to the second fluid line 404 at a location between the prime mover B port 414 and the actuator B port 444.

The reclamation device 80 thus allows a volume increase on the side of the actuator 440 having a trapped volume of hydraulic fluid, reducing its pressure to a nominal value and simultaneously capturing a portion of the potential energy stored within the compressed fluid, prior to reversal. In addition, the reclamation device 80 also reduces hydraulic shock associated with rapid decompression. At the time of each reversal of the pistons 445, 465 within the respective cylinder housings 442, 462, hydraulic circuit pressures are first reduced through the decay of pressure associated with the additional compressed volume $V_c$ into the corresponding one of the first and second reclamation modules 81, 88.

Figure 6:
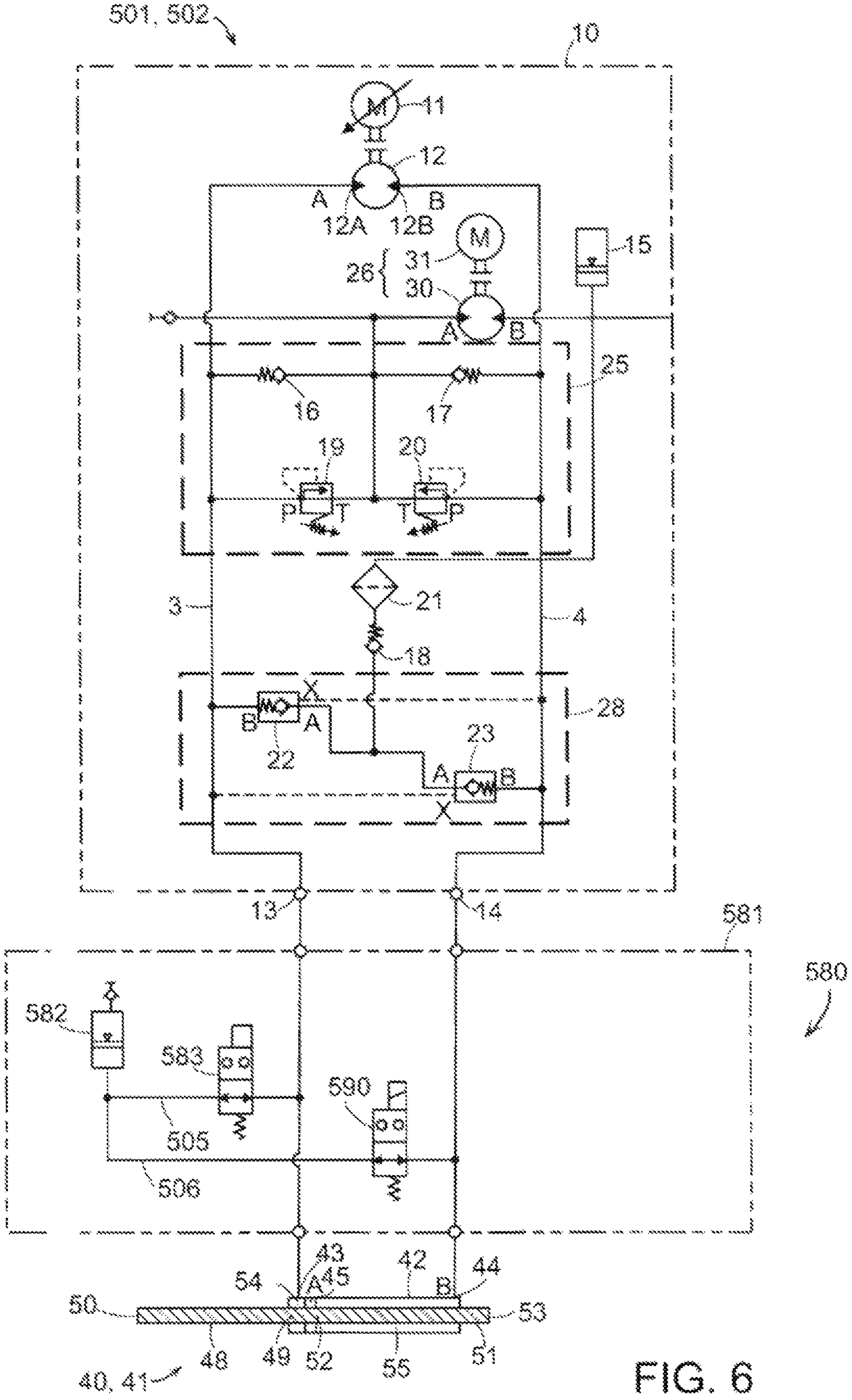
FIG. 6 is a schematic diagram of another alternative embodiment hydraulic circuit employed in an oscillating hydraulic system.

Referring to FIG. 6, another alternative embodiment hydraulic system 501 includes a hydraulic circuit 502. The hydraulic circuit 502 includes the actuator 40 and the prime mover 10 described above with respect to FIG. 1. The hydraulic circuit 502 also includes an alternative embodiment reclamation device 580 disposed in the hydraulic circuit 502 between the prime mover 10 and the actuator 40. Like the reclamation device 80 of FIG. 1, the reclamation device 580 of FIG. 6 is configured to capture and store hydraulic fluid displaced from the actuator 40 during operation of the prime mover 10. In particular, the reclamation device 580 is configured to capture and store the excess hydraulic fluid due to compression of fluid $V_c$ displaced from the actuator 40 during the-transition between the advancing stroke and the retracting stroke of the actuator 40. However, the reclamation device 580 of FIG. 6 has fewer components than the reclamation device 80 shown in FIG. 1 since the reclamation device 580 includes a single common accumulator 582, as will now be described in detail.

The reclamation device 580 includes a reclamation module 581 that includes a reclamation accumulator 582. The reclamation accumulator 582 is connected to the first fluid line 3 via a first branch line 505 and is connected to the second fluid line 4 via a second branch line 506. In particular, the reclamation accumulator 582 is disposed at a terminus of the first and second branch lines 505, 506. The first branch line 505 is connected to the first fluid line 3 at a location between the prime mover A port 13 and the actuator A port 43. The second branch line 506 is connected to the second fluid line 4 at a location between the prime mover B port 14 and the actuator B port 44. The reclamation device 580 includes a first control valve 583 is disposed in the first branch line 505 between the reclamation accumulator 582 and the first fluid line 3. The reclamation device 580 includes a second control valve 590 disposed in the second branch line 506 between the reclamation accumulator 582 and the second fluid line 4.

In the hydraulic circuit 502 including the reclamation device 580, as the actuator 40 is advanced, the pump 12 provides fluid to the actuator 40 via the prime mover A port 13 and the actuator A port 43, driving the piston 45 from the A side to the B side within the cylinder housing 42. As the piston 45 advances, the first control valve 583 is closed, the second control valve 590 is open, and pressure builds in the first fluid line 3 between the prime mover A port 13 and the actuator A port 43.

As actuator 40 is advanced, the additional compressed volume $V_c$ associated with the first chamber 54 increases, consuming any volume in the reclamation accumulator 582 which is above the minimum pressure $P_{min}$. Once the reclamation accumulator 582 reaches the minimum pressure $P_{min}$, any volume needed in the first chamber 54 that is not available from the second chamber 55 will be supplied by the charge pump 30 drawing from accumulator 15. The second control valve 590 can be closed after the reclamation accumulator 582 reaches the minimum pressure $P_{min}$ and prior to reversal of motion.

After the advancing motion stops, but prior to reversal, the first control valve 583 is opened, allowing flow of hydraulic fluid from the first chamber 54 into the reclamation accumulator 582. This flow will consume a portion of the additional compressed volume $V_c$ reducing the pressure in the first chamber 54 to near the minimum pressure $P_{min}$. The pump 12 pauses momentarily while the first chamber 54 of the cylinder 41 is decompressing. When the pressure of the first fluid line 3 has stabilized to the desired nominal value, the actuator 40 can reverse due to higher force developing in the second chamber 55 of the cylinder 41.

In the hydraulic circuit 502 including the reclamation device 580, as the actuator 40 is retracted, the pump 12 provides fluid to the actuator 40 via the prime mover B port 14 and the actuator B port 44, driving the piston 45 from the B side to the A side within the cylinder housing 42. As the piston 45 retracts, the second control valve 590 is closed, the first control valve 583 is open, and pressure builds in the second fluid line 4 between the prime mover B port 13 and the actuator B port 44.

As the actuator 40 is retracted, the additional compressed volume $V_c$ associated with the second chamber 55 increases, consuming any volume in in the reclamation accumulator 582 that is above the minimum pressure $P_{min}$. Once the reclamation accumulator 582 reaches the minimum pressure $P_{min}$, any volume needed in the second chamber 55 that is not available from the first chamber 54 will be supplied by the charge pump 30 drawing from the main accumulator 15. The first control valve 583 is closed after the reclamation accumulator 582 reaches the minimum pressure $P_{min}$ and prior to reversal of motion.

After the retracting motion stops, but prior to reversal, the second control valve 590 is opened, allowing flow of hydraulic fluid from the second chamber 55 into the reclamation accumulator 582. This flow will consume a portion of the additional compressed volume $V_c$. The pump 12 pauses momentarily while the second chamber 55 of the cylinder 41 is decompressing. When the pressure of the second fluid line 4 has stabilized to the desired nominal value, the actuator 40 can reverse due to higher force developing in the first chamber 54 of the cylinder 41.

Subsequent motions of the piston 45, both advancing and retracting, will follow the pattern as outlined in the sections above.

The reclamation device 580 thus allows a volume increase on the side of the actuator 40 having a trapped volume of hydraulic fluid, reducing its pressure to a nominal value and simultaneously capturing a portion of the potential energy stored within the compressed fluid, prior to reversal. In addition, the reclamation device 580 also reduces hydraulic shock associated with rapid decompression. In addition, the reclamation device 580 avoids a sudden loss of fluid from the main circuit, stabilizing control of the device which maintains the minimum pressure $P_{min}$. At the time of each reversal of the piston 45 within the cylinder housing 42, hydraulic circuit pressures are first reduced through the decay of pressure associated with the additional compressed volume $V_c$ into the reclamation accumulator 582 of the reclamation device 580.

Although the reclamation device 580 is illustrated herein as being employed in a hydraulic circuit that includes the prime mover 10 and actuator 40 of FIG. 1, the reclamation device 580 is not limited to being used with the prime mover 10 and actuator 40 of FIG. 1. It is understood that other prime movers and actuators may be substituted for the prime mover 10 and the actuator 40 illustrated in FIG. 1, including, but not limited to, the prime movers 200, 300, 400 and actuators 240, 340, 440 described above, as long as the resulting hydraulic system generates an oscillating motion and is configured to be connected to a load in both directions of the oscillating motion.

This embodiment could also be used in the variant described reversing the function of the first and second control valves 583 and 590 and operating the reclamation accumulator 582 at a pressure near the higher pressure $P_s$.

Selective illustrative embodiments of the hydraulic circuit including the reclamation device are described above in some detail. It should be understood that only structures considered necessary for clarifying the hydraulic circuit have been described herein. Other conventional structures, and those of ancillary and auxiliary components of the hydraulic circuit including the reclamation device, are assumed to be known and understood by those skilled in the art. Moreover, while working examples of the hydraulic circuit including the reclamation device have been described above, the hydraulic circuit and the reclamation device are not limited to the working examples described above, but various design alterations may be carried out without departing from the hydraulic circuit as set forth in the claims.

We claim:

1. A hydraulic circuit, comprising:

a prime mover that is configured to generate flow of hydraulic fluid within the hydraulic circuit, the prime mover including a prime mover A port and a prime mover B port;

an actuator that includes an actuator A port that is connected to the prime mover A port via a first fluid line, and an actuator B port that is connected to the prime mover B port via a second fluid line, the actuator being configured to a) provide a motion that oscillates between an advancing stroke in a first direction and a retracting stroke in second direction that is opposed to the first direction, the motion achieved via hydraulic fluid provided by the prime mover via the first and second fluid lines, and b) be connected to a load in each of the advancing stroke and the retracting stroke; and a reclamation device that is disposed in the hydraulic circuit between the prime mover and the actuator, wherein the prime mover comprises:

a motor;

a primary pump that is driven by the motor, the primary pump including a first pump port connected to the prime mover A port via the first fluid line and a second pump port connected to the prime mover B port via the second fluid line;

a main accumulator; and a charge pump that is connected to the first fluid line via a first valve and to the second fluid line via a second valve, the charge pump configured to draw fluid from the main accumulator and maintain a minimum pressure in the first fluid line and the second fluid line, and the reclamation device comprises a reclamation accumulator, the reclamation accumulator is connected to, and configured to deliver fluid having a fluid pressure that is greater than the minimum pressure to, the first fluid line via a third valve and the second fluid line via a fourth valve, the fluid having a fluid pressure greater than the minimum pressure is prevented from flowing from the first fluid line to the main accumulator by a fifth valve, the fluid having a fluid pressure greater than the minimum pressure is prevented from flowing from the second fluid line to the main accumulator by a sixth valve, and the reclamation device is configured to capture and store a portion of hydraulic fluid displaced from the actuator during a transition between the advancing stroke and the retracting stroke, where the portion of hydraulic fluid corresponds to an amount of hydraulic fluid equal to a volume of fluid required to compensate for compression of fluid within the hydraulic circuit due to system pressure and load pressure.

2. The hydraulic circuit of claim 1, wherein the reclamation accumulator is connected to the first fluid line via a first branch line and is connected to the second fluid line via a second branch line;

the third valve is a control valve disposed in the first branch line between the reclamation accumulator and the first fluid line; and the fourth valve is a control valve disposed in the second branch line between the reclamation accumulator and the second fluid line, and wherein the first branch line is connected to the first fluid line at a location between the prime mover A port and the actuator A port, and the second branch line is connected to the second fluid line at a location between the prime mover B port and the actuator B port.

3. The hydraulic circuit of claim 1, wherein the hydraulic circuit is a closed circuit, and the primary pump is a bi-direction fluid pump that is driven by a variable speed electric motor.

4. The hydraulic circuit of claim 1, wherein the actuator is a linear actuator.

5. The hydraulic circuit of claim 1, wherein the actuator comprises:

a cylinder;

a piston disposed in the cylinder that segregates an interior space of the cylinder into a first chamber that includes the actuator A port and a second chamber that includes the actuator B port;

a first rod disposed in the first chamber and having a first end that is connected to one side of the piston, and a second end that is configured to be connected to a load; and a second rod disposed in the second chamber and having a first end that is connected to another side of the piston, and a second end that is configured to be connected to a load.

6. The hydraulic circuit of claim 1, wherein the actuator comprises:

a cylinder;

a piston disposed in the cylinder that segregates an interior space of the cylinder into a first chamber that includes the actuator A port and a second chamber that includes the actuator B port; and a rod disposed in the second chamber and having a first end that is connected to one side of the piston, and a second end that is configured to be connected to a load.

7. The hydraulic circuit of claim 1, wherein the hydraulic circuit is a closed circuit, the primary pump is a bi-direction fluid pump that is driven by a variable speed electric motor, and the actuator comprises:

a cylinder;

a piston disposed in the cylinder that segregates an interior space of the cylinder into a first chamber that includes the actuator A port and a second chamber that includes the actuator B port;

a first rod disposed in the first chamber and having a first rod first end that is connected to one side of the piston, and a first rod second end that is configured to be connected to a load; and a second rod disposed in the second chamber and having a second rod first end that is connected to another side of the piston, and a second rod second end that is configured to be connected to a load.

8. The hydraulic circuit of claim 1, wherein the main accumulator is a gas charged expansion tank that is sized to store excess hydraulic fluid volume from the actuator, the prime mover and the reclamation device.

9. The hydraulic circuit of claim 1, wherein the prime mover comprises:

a pressure relief device connected to the first fluid line at a location between the first pump port and the prime mover port A and connected to the second fluid line at a location between the second pump port and the prime mover port B.

10. The hydraulic circuit of claim 1, wherein the charge pump is connected to the first fluid line at a location between the first pump port and the prime mover port A, and the charge pump is connected to the second fluid line at a location between the second pump port and the prime mover port B.

* * * * *